(12) United States Patent
Yin

(10) Patent No.: US 7,688,585 B2
(45) Date of Patent: Mar. 30, 2010

(54) FAN MOUNTING APPARATUS FOR HEAT DISSIPATION

(75) Inventor: Xiu-Zhong Yin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 177 days.

(21) Appl. No.: 11/859,795

(22) Filed: Sep. 24, 2007

(65) Prior Publication Data
US 2009/0059521 A1 Mar. 5, 2009

(30) Foreign Application Priority Data
Aug. 31, 2007 (CN) .................. 2007 2 0200938 U

(51) Int. Cl.
*H05K 7/20* (2006.01)
*F01D 25/24* (2006.01)
(52) U.S. Cl. ............... 361/695; 361/679.48; 415/213.1; 454/184
(58) Field of Classification Search ............ 361/679.46, 361/679.48, 690, 694–695; 165/80.3; 312/223.2, 312/236; 415/213.1, 214.1; 454/184; 248/300, 248/309.1, 694
See application file for complete search history.

(56) References Cited

U.S. PATENT DOCUMENTS

| 5,514,036 A | * | 5/1996 | Lin | 454/184 |
| 6,556,437 B1 | * | 4/2003 | Hardin | 361/679.48 |
| 7,301,768 B2 | * | 11/2007 | Fan et al. | 361/695 |
| 7,511,955 B2 | * | 3/2009 | Yin | 361/695 |
| 7,522,415 B2 | * | 4/2009 | Fan et al. | 361/695 |
| 7,537,480 B2 | * | 5/2009 | Li | 439/485 |
| 2006/0268514 A1 | * | 11/2006 | Fan et al. | 361/695 |
| 2008/0101019 A1 | * | 5/2008 | Tao | 361/695 |
| 2008/0151495 A1 | * | 6/2008 | Yin et al. | 361/695 |
| 2008/0158813 A1 | * | 7/2008 | Yin | 361/695 |
| 2009/0034191 A1 | * | 2/2009 | Yin | 361/695 |

FOREIGN PATENT DOCUMENTS

CN 101202124 A * 6/2008

* cited by examiner

*Primary Examiner*—Jayprakash N Gandhi
*Assistant Examiner*—Robert J Hoffberg
(74) *Attorney, Agent, or Firm*—Frank R. Niranjan

(57) ABSTRACT

A fan mounting apparatus for dissipating heat from an electronic device, the mounting apparatus includes a bracket (50) and a fan module (40). The bracket defines an opening (57), two vertical slots (59) at opposite sides of the opening and two fixing holes (58) under the slots and aligned with the respective slots. The fan module includes a fan (10) and a pair of clamping members (30). The pair of clamping members respectively attached to opposite sides of the fan, an engaging portion (35) formed on each clamping member for engaging with the corresponding slot of the bracket, and each engaging portion has a sliding portion (351) and a clamping portion (353), wherein each sliding portion is capable of being received in the corresponding slot, and the clamping portion engaging with the fixing hole.

20 Claims, 4 Drawing Sheets

FAN MOUNTING APPARATUS FOR HEAT DISSIPATION

BACKGROUND

1. Field of the Invention

The present invention relates to fan mounting apparatuses, and more particularly to a fan mounting apparatus for a computer system.

2. Description of Related Art

In a working computer system, a large amount of heat is generated from electric elements of the computer system. If the heat is not dissipated timely, the electric elements may be damaged. So heat-dissipating devices are desired.

A fan is often used as a conventional means to dissipate the heat from the computer system. In conventional means, a bracket is provided for receiving a fan. A plurality of through holes is defined in the bracket. In installing the fan to a plate of the computer system, the fan is received into the bracket. The bracket together with the fan is placed on the plate, which defines a plurality of screw holes therein. The through holes of the bracket align with the screw holes of the plate. The fan is enclosed by the bracket and the plate. A plurality of screws extends through the through holes and is screwed into the corresponding screw holes. The fan is thereby secured to the plate of the computer system. With this mounting means, it is well known that assembly and disassembly of the fans is very inconvenient.

What is needed, therefore, is a mounting apparatus for conveniently installing and removing a fan in a computer system.

SUMMARY

A fan mounting apparatus for dissipating heat from an electronic device includes a bracket and a fan module. The bracket has a retaining wall, the retaining wall defines an opening, two vertical slots at opposite sides of the opening respectively, and two fixing holes under the slots and aligned with the respective slots. The fan module includes a fan and a pair of clamping members. The fan has a fan opening aligned with the opening of the bracket for airflow flowing therethrough. The pair of clamping members respectively attached to opposite sides of the fan, an engaging portion formed on each clamping member for engaging in the corresponding slot of the bracket, and each engaging portion has a sliding portion and a clamping portion, wherein each engaging portion is capable of being directed into the slot in an up to down direction with the sliding portion received in the slot, and the clamping portion engaging in the fixing hole from an outer surface of the retaining wall facing away from the fan.

Other advantages and novel features of the present invention will become more apparent from the following detailed description of a preferred embodiment when taken in conjunction with the accompanying drawings, in which:

DETAILED DESCRIPTION

Figure 1:
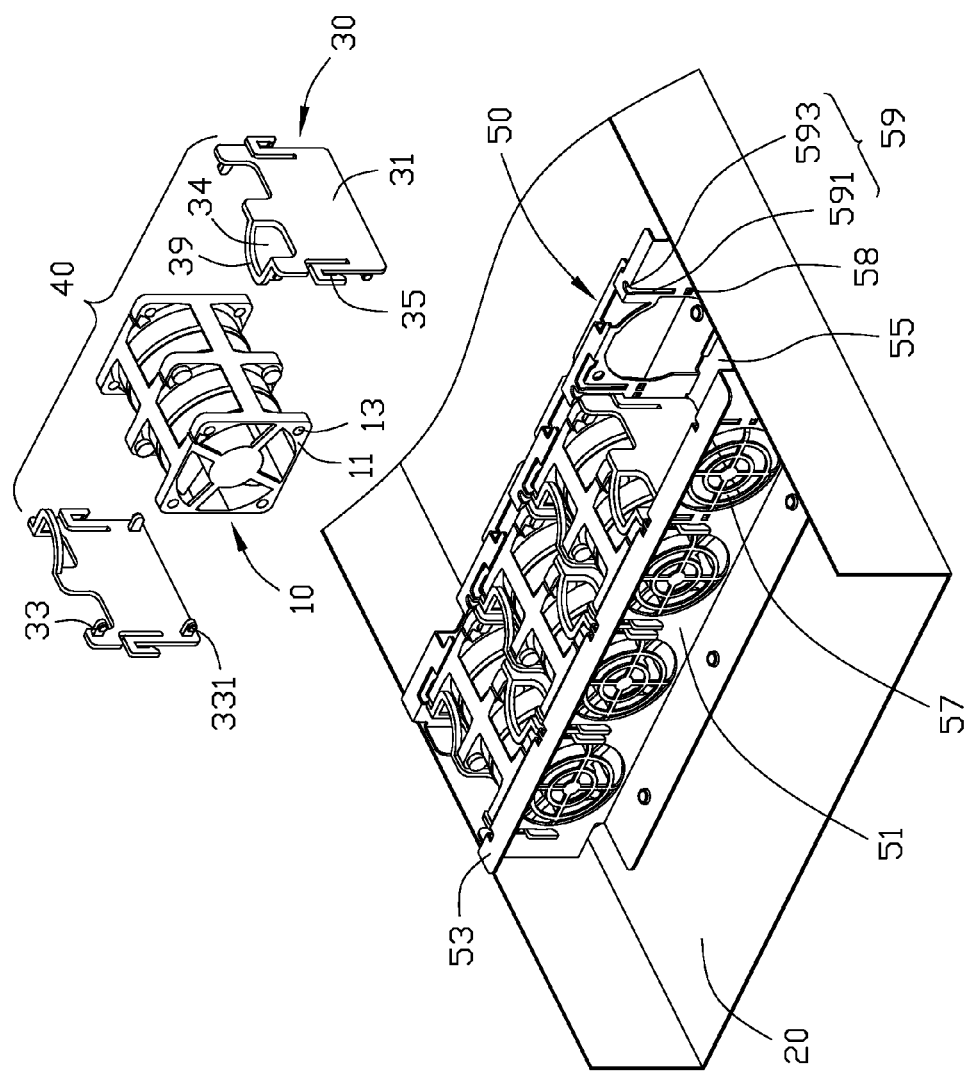
FIG. 1 is exploded, isometric view of a mounting apparatus for fans according to a preferred embodiment of the present invention, the mounting apparatus for fans can be secured within a chassis, the mounting apparatuses for fans including a chassis, a fan bracket, and a plurality of fan modules.

Referring to FIG. 1, a mounting apparatus for fans in accordance with a preferred embodiment of the present invention includes a fan bracket 50, a chassis 20 configured for receiving the fan bracket 50, and a plurality of fan modules 40 for dissipating heat from electronic devices (not shown) within the chassis 20.

The fan bracket 50 has a rectangular bottom wall 55, and a pair of retaining walls 51 perpendicularly extending up from opposite sides of the bottom wall 55. The fan bracket 50 is configured for providing a U-shaped corridor for receiving the fan modules 40. A plurality of pairs of aligned blow openings 57 is defined in the retaining walls 51. Two slots 59 are respectively defined on opposite sides of each blow opening 57 in each retaining wall 51. Each slot 59 is perpendicular to the bottom wall 55. A flange 53 extends out from a top edge of each retaining wall 51. An enlarged guiding portion 593 is defined where a top end of each slot 59 meets the corresponding flange 53. Each slot 59 further includes a narrow limiting portion 591. A generally square shaped engaging hole 58 is defined under, and spaced apart from, the slot 59.

Figure 2:
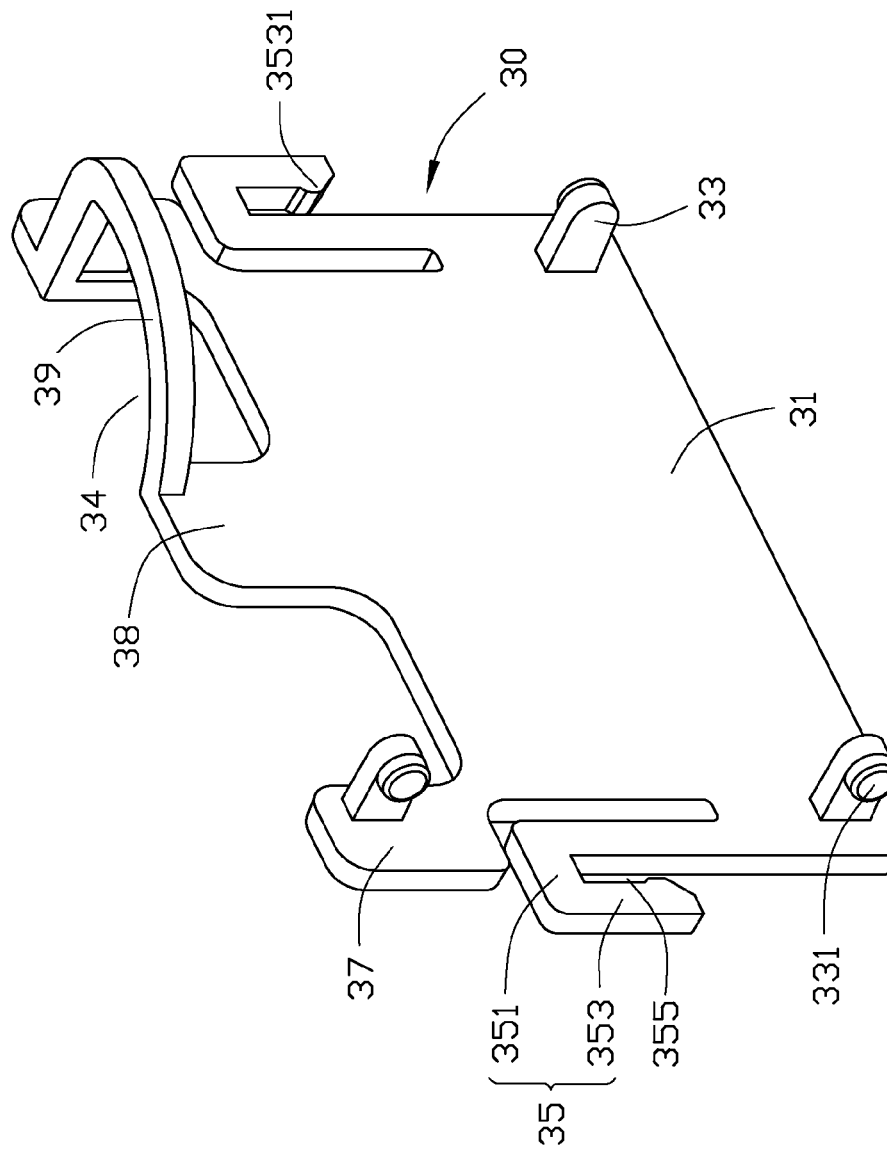
FIG. 2 is an enlarged view of a clamping member of FIG. 1.

Referring to FIG. 1 and FIG. 2, each fan module 40 includes a generally cubic-shaped fan 10 and a pair of clamping members 30. The fan 10 has two opposite rectangular sidewalls 11 each defining fan openings 15 respectively corresponding to the blow openings 57 of the fan bracket 50. Each sidewall 11 defines a locking hole 13 at each corner thereof. Each clamping member 30 has a rectangular base wall 31. A connecting portion 33 is formed on each corner of the base wall 31. Each connecting portion 33 defines a post 331 on a top end thereof corresponding to one of the locking holes 13 of the fan 10. The base wall 31 has two same first supporting portions 37 on the top two sides thereof, and a second supporting portion 38 located between the two first supporting portions 37. An operating portion 39 extends horizontally from one of the first supporting portions 37 and the second supporting portion 38 of the base wall 31. The operating portion 39 and the base wall 31 cooperatively define a finger opening 34 therein. The base wall 31 has two opposite side edges. An n-shaped engaging portion 35 extends out from each side edge of the base wall 31. Each engaging portion 35 has a sliding portion 351 and a clamping portion 353. Each clamping portion 353 has a hook 3531 at a distal end thereof. Each engaging portion 35 cooperatively forms a receiving space 355 with the base wall 31. The enlarged guiding portion 593 allows the clamping portion 353 entering therethrough. A width of the clamping portion 353 is less than that of the slots 59.

Figure 3:
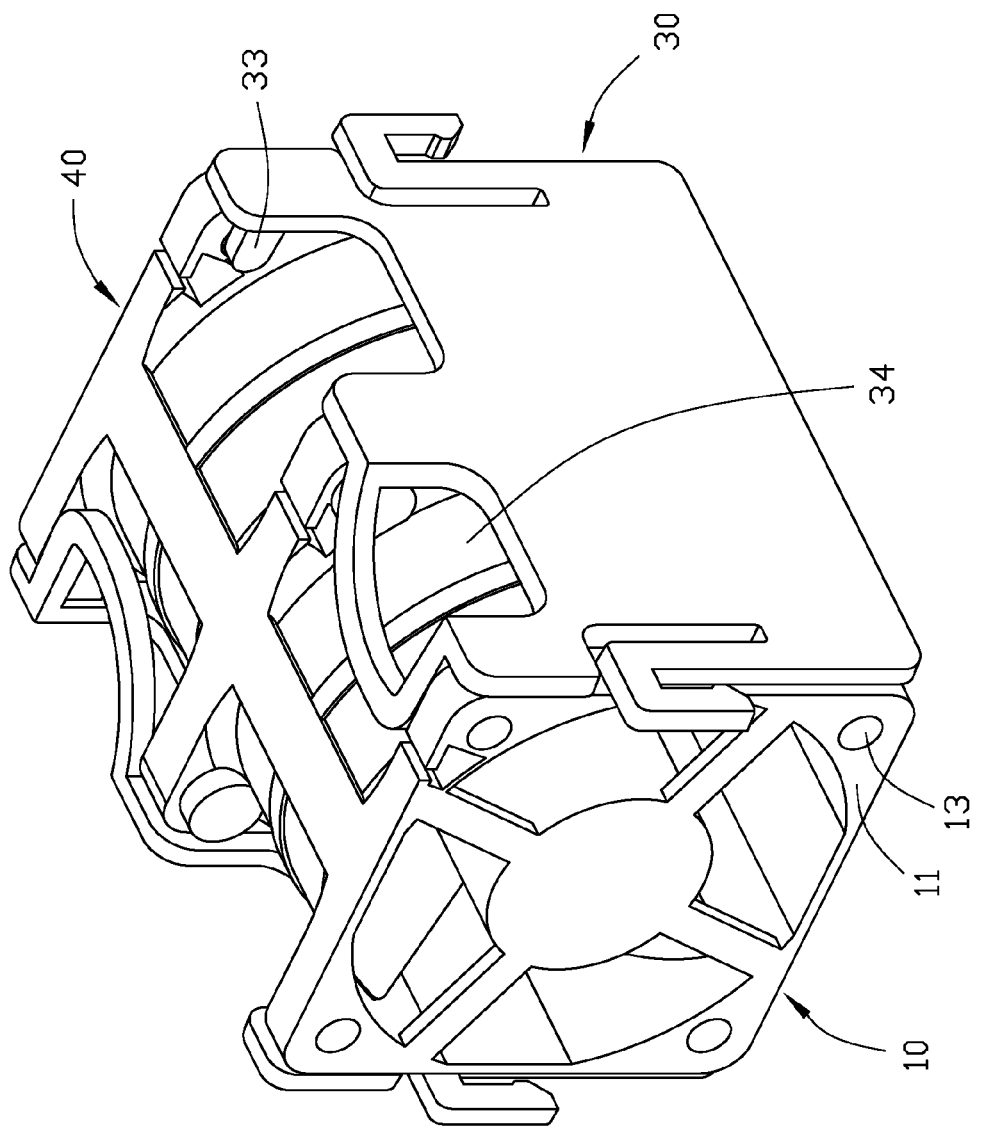
FIG. 3 is an assembled view of the fan module of FIG. 1.
Figure 4:
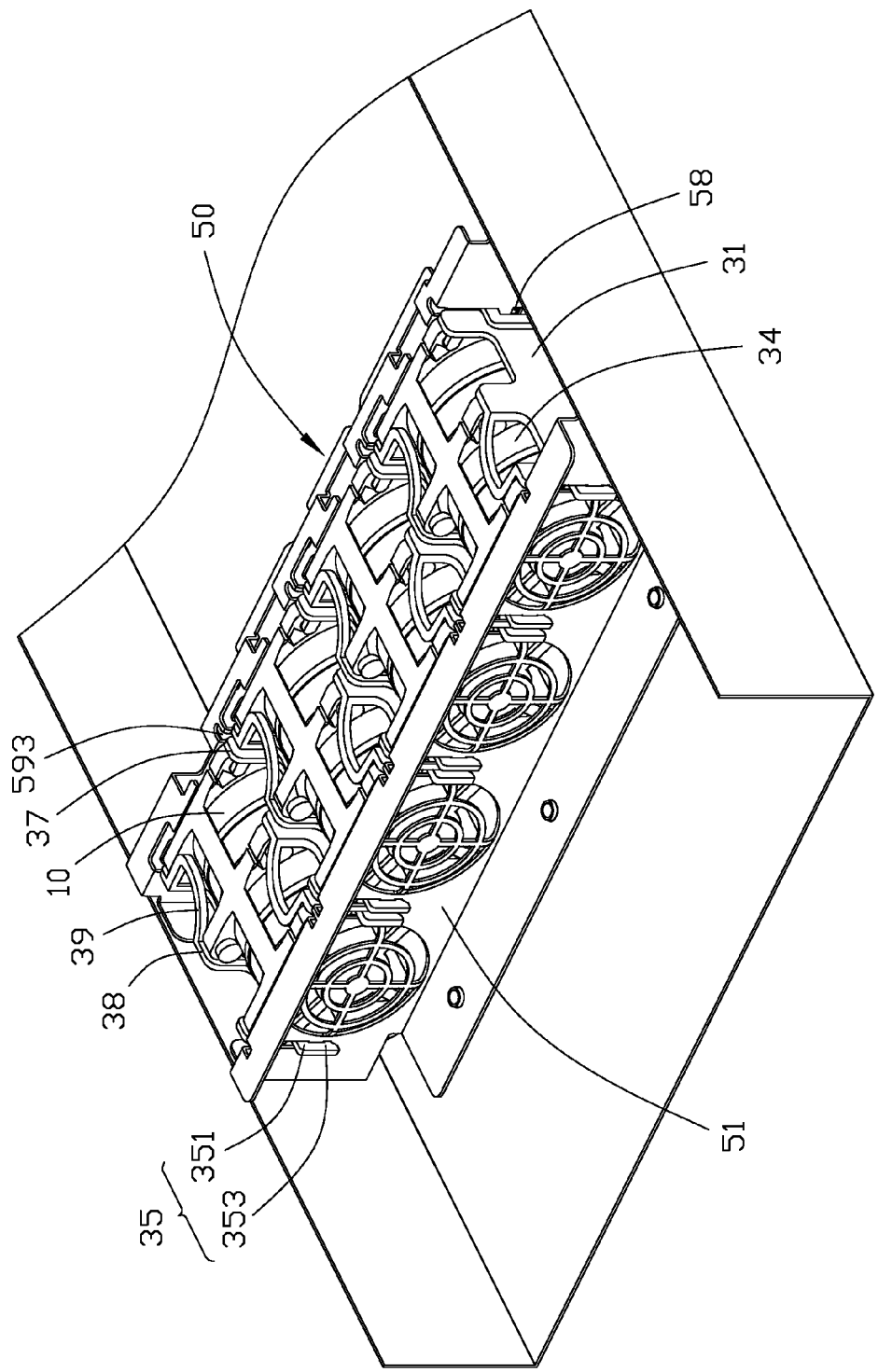
FIG. 4 is an assembled view of FIG. 1.

Referring to FIG. 3 and FIG. 4, when assembling the mounting apparatus, the fan bracket 50 is positioned in the chassis 20. Then for each of a desired number of the fan modules 40, two clamping members 30 are attached to the fan 10 via the posts 331 being correspondingly inserted into the locking holes 13 of the fan 10. The fan module 40 is then positioned in a vertical direction. The sliding portion 351 of each engaging portion 35 is respectively slid into the corresponding limiting portion 591 of the retaining wall 51 with the clamping portion 353 entering through the enlarged guiding portion 593 to abut against the outer surface of the retaining wall 51 of the bracket 50 causing the clamping portion 353 to deform outwardly until the hook 3531 of the clamping portion 353 engaging with the fixing hole 58, at which point the clamping portion 353 rebounds and clamps therein. The retaining wall 51 of the fan bracket 50 is received in the receiving space 355. Thus, the fan module 40 is securely mounted to the fan bracket 50, and the steps are repeated for each of the remaining fan modules 40. When replacing one of the fan modules 40, the module 40 is lifted up by pulling up on the operating portion 39 of each clamping member 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fan mounting apparatus for dissipating heat from an electronic device, the mounting apparatus comprising:
    a bracket having a retaining wall, the retaining wall defining an opening, two vertical slots at opposite sides of the opening respectively, and two fixing holes under the slots and aligned with the respective slots;
    a fan having a fan opening aligned with the opening of the bracket for airflow flowing therethrough, and
    a pair of clamping members respectively attached to opposite sides of the fan, an engaging portion formed on each clamping member for engaging in the corresponding slot of the bracket, and each engaging portion having a sliding portion and a clamping portion, wherein each engaging portion is capable of being directed into the slot in an up to down direction with the sliding portion received in the slot, and the clamping portion engaging in the fixing hole from an outer surface of the retaining wall facing away from the fan.

2. The fan mounting apparatus as described in claim 1, wherein the bracket further comprises another retaining wall parallel to the retaining wall, and the fan is disposed between the two retaining walls.

3. The fan mounting apparatus as described in claim 1, wherein each clamping portion has a hook at a distal end thereof, for engaging in the fixing hole of the bracket.

4. The fan mounting apparatus as described in claim 1, wherein a width of the clamping portion is less than a width of the slots.

5. The fan mounting apparatus as described in claim 1, wherein each slot has an enlarged guiding portion at a top end thereof for allowing the clamping portion extending therethrough.

6. The fan mounting apparatus as described in claim 1, wherein the fan having a pair of locking holes defined therein and at least one pair of posts is perpendicularly formed on each clamping member engaging in of the respective locking holes.

7. The fan mounting apparatus as described in claim 1, wherein each clamping member comprises a base wall, and an operating portion is perpendicularly formed on the base wall for facilitating manually lifting up the fan.

8. The fan mounting apparatus as described in claim 7, wherein each engaging portion extends out from a side edge of the base wall.

9. A fan mounting apparatus for dissipating heat from an electronic device, the mounting apparatus comprising:
    a bracket having a pair of parallel retaining walls, each of the retaining walls defining an opening, at least one vertical slot, and at least one fixing hole adjacent to the vertical slot; and
    a fan module comprising a fan and at least one clamping member, the at least one clamping member attached to one side of the fan, two engaging portions formed on opposite sides of the clamping member, each engaging portion forming a receiving space for engaging with the retaining wall, wherein each of the engaging portions is capable of being directed into the corresponding at least one slot from a top end thereof to cause the fan module to be fitted between the two retaining walls with the engaging portions respectively engaged in the corresponding at least one fixing holes of the bracket.

10. The fan mounting apparatus as described in claim 9, wherein another clamping member configured symmetrically to the clamping member is provided to attach to an opposite side of the fan for cooperatively retaining the fan in the bracket.

11. The fan mounting apparatus as described in claim 9, wherein each engaging portion comprises a sliding portion and a clamping portion, and a width of the clamping portion is less than that of the two at least one slots.

12. The fan mounting apparatus as described in claim 11, wherein the two at least one slots have an enlarged guiding portion at the top ends thereof for allowing the clamping portion extending therethrough.

13. The fan mounting apparatus as described in claim 11, wherein each of the clamping portions has a hook at a distal end thereof, for engaging in the corresponding one of the two at least one fixing holes of the bracket.

14. The fan mounting apparatus as described in claim 9, wherein the fan has a pair of locking holes defined therein, and at least one pair of posts is perpendicularly formed on the at least one clamping member for inserting into the locking holes.

15. The fan mounting apparatus as described in claim 9, wherein the at least one clamping member comprises a base wall, and an operating portion is bent from a top of the base wall for facilitating manually lifting up the fan module.

16. The fan mounting apparatus as described in claim 9, wherein each engaging portion extends out from opposite side edges of the base wall.

17. The fan mounting apparatus as described in claim 9, wherein each of the at least one vertical slots comprises a pair of slots respectively defined at opposite sides of the corresponding opening.

18. A heat dissipating apparatus for dissipating heat from an electronic device, the mounting apparatus comprising:
    a bottom plate;
    a bracket having two parallel retaining walls perpendicular to the bottom plate, each of the retaining walls having a plurality of airflow windows, a plurality of vertical slots, and a plurality of fixing holes aligned with and adjacent to the respective vertical slots; and
    a plurality of fan modules disposed between the retaining walls, each of the fan modules comprising a fan and two clamping members attached to opposite sides of the fan, each of the clamping members having a sliding portion extending through the corresponding vertical slot and a clamping portion depending from the sliding portion, the clamping portion being exposed at an opposite side of the retaining wall to the fan, and engaged in the corresponding fixing hole from an outer surface of the retaining wall facing away from the fan.

19. The heat dissipating apparatus as described in claim 18, wherein each clamping portion has a hook at a distal end thereof for engaging in the fixing hole of the bracket.

20. The heat dissipating apparatus as described in claim 18, wherein a width of the clamping portion is less than a width of the vertical slots.

* * * * *